United States Patent [19]
Zeltner et al.

[11] Patent Number: 5,444,123
[45] Date of Patent: Aug. 22, 1995

[54] HALOGEN-FREE FLAMEPROOFED THERMOPLASTIC MOLDING MATERIALS BASED ON POLYPHENYLENE ETHERS AND POLYSTYRENE

[75] Inventors: Doris Zeltner, Roemerberg; Norbert Niessner; Friedrich Seitz, both of Friedelsheim; Ranier Neumann, Mutterstadt; Stefan Seelert, Frankenthal, all of Germany

[73] Assignee: BASF Aktiengesellschaft, Ludwigshafen, Germany

[21] Appl. No.: 203,512

[22] Filed: Feb. 28, 1994

Related U.S. Application Data

[63] Continuation-in-part of Ser. No. 940,337, Sep. 3, 1992, abandoned.

Foreign Application Priority Data

Sep. 6, 1991 [DE] Germany .................. 41 29 765.2

[51] Int. Cl.$^6$ ............ C08F 30/02; C08F 230/02; C08L 43/02; C08L 71/12
[52] U.S. Cl. ................... 525/133; 525/150; 525/209; 526/274; 526/276; 526/277; 526/278
[58] Field of Search ............ 525/133, 150, 209; 526/277, 278, 274, 276

[56] References Cited

U.S. PATENT DOCUMENTS

| | | | |
|---|---|---|---|
| 2,993,033 | 7/1961 | O'Brien | 526/277 |
| 4,014,839 | 3/1977 | Kraft et al. | 260/29.6 |

(List continued on next page.)

FOREIGN PATENT DOCUMENTS

| | | |
|---|---|---|
| 0019111 | 11/1980 | European Pat. Off. |
| 0147724 | 7/1985 | European Pat. Off. |
| 0301523 | 2/1989 | European Pat. Off. |

(List continued on next page.)

*Primary Examiner*—Thomas Hamilton, III
*Attorney, Agent, or Firm*—Keil & Weinkauf

[57] ABSTRACT

Halogen-free flameproofed thermoplastic molding materials based on polyphenylene ethers and polystyrene containing, as essential components, A) from 5 to 92% by weight of one or more polyphenylene ethers, B) from 5 to 92% by weight of a vinylaromatic polymer and C) from 3 to 25% by weight of a flameproofing agent based on C1) from 20 to 100% by weight (based on the total amount of C) of a polymeric phosphorus compound which is obtained by polymerizing or copolymerizing one or more compounds of the following structure:

$$\begin{array}{c} R^2 \diagdown \phantom{X} \diagup R^3 \\ C = C \\ R^1 \diagup \phantom{X} \diagdown (U)_m - (R^6)_n - (V)_p - \underset{\underset{R^4}{\overset{(Y)_s}{|}}}{\overset{(W)_q}{\overset{|}{P}}} - (X)_r - R^5 \end{array}$$

where $$-(R^7)_t - \overset{\overset{Z}{|}}{C}_v - (R^8)_u -$$

$R^1$, $R^2$, $R^3$, $R^4$, $R^5$, $R^{10}$ and $R^{11}$ are each hydrogen, alkyl, cycloalkyl, aralkyl or aryl,
$R^7$, $R^8$ and $R^9$ are each alkylidene, cycloalkylidene, aralkylidene or arylidene,
m, p, q, r, s, t, u and v are each 0 or 1,
n is 0, 1 or 2,
U is COO, O, S or $NR^9$,
V, W, X and Y are each O, S or $NR^9$ and
Z is O, S or $NR^{10} R^{11}$, and C2) from 0 to 80% by weight (based on the total amount of C) of a low molecular weight phosphorus compound selected from the group consisting of the phosphine oxides, phosphates, phosphinic acids and salts and esters thereof, phosphonic acids and salts and esters thereof and red phosphorus.

6 Claims, No Drawings

U.S. PATENT DOCUMENTS

| | | | |
|---|---|---|---|
| 4,156,699 | 5/1979 | White et al. | 260/823 |
| 4,307,040 | 12/1981 | Block et al. | 260/986 |
| 4,350,793 | 9/1982 | Schmidt et al. | 525/133 |
| 4,371,672 | 2/1983 | Younes | 525/391 |
| 4,680,342 | 7/1987 | Axelrod et al. | 526/278 |
| 5,116,882 | 5/1992 | Grey et al. | 526/277 |
| 5,232,816 | 8/1993 | Seio et al. | 526/277 |

FOREIGN PATENT DOCUMENTS

| | | | |
|---|---|---|---|
| 1134836 | 8/1962 | Germany | 526/277 |
| 1148751 | 5/1963 | Germany | 526/277 |
| 3002792 | 11/1978 | Germany . | |
| 2823167 | 7/1981 | Germany . | |
| 60-255809 | 12/1985 | Japan . | |
| 1265094 | 10/1989 | Japan . | |
| 877905 | 9/1961 | United Kingdom | 526/277 |

HALOGEN-FREE FLAMEPROOFED THERMOPLASTIC MOLDING MATERIALS BASED ON POLYPHENYLENE ETHERS AND POLYSTYRENE

This application is a continuation-in-part of application Ser. No. 07/940,337, filed on Sep. 3, 1992 now abandoned.

The present invention relates to halogen-free flameproofed thermoplastic molding materials base on polyphenylene ethers and polystyrene, containing, as essential components, A) from 5 to 92% by weight of one or more polyphenylene ethers, B) from 5 to 92% by weight of a vinylaromatic poller and C) from 3 to 25% by weight of a flameproofing agent based on C1) from 20 to 100% by weight (based on the total amount of C) of a polymeric phosphorus compound which is obtained by polymerizing or copolymerizing one or more compounds of the following structure:

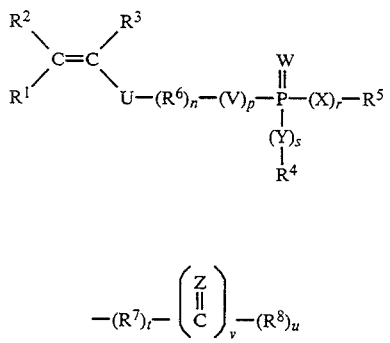

$R^1$, $R^2$, $R^3$, $R^4$, $R^5$, $R^9$ and $R^{10}$ are each hydrogen, alkyl, cycloalkyl, aralkyl or aryl, $R^7$ and $R^8$ are each alkylidene, cycloalkylidene, aralkylidene or arylydene, p, r, s, t, u and v are each 0 or 1, n is 0, 1 or 2, U is

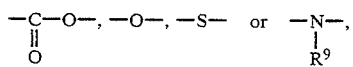

V, X and Y are each

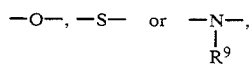

w is $=O$, $=S$ or $=NR^9$, z is $=O$, $=S$ or $=NR^{10}$,

C2) from 0 to 80% by weight (based on the total amount of C) of a low molecular weight phosphorus compound selected from the group consisting of the phosphine oxides, phosphates, phosphinic acids and salts and esters thereof, phosphonic acids and salts and esters thereof and red phosphorus.

The present invention furthermore relates to the use of these molding materials for the production of films and moldings and to the moldings which are obtainable using these molding materials as essential components.

Flameproofed thermoplastic molding materials which contain untoughened or toughened styrene polymers and polyphenylene ethers and a phosphorus-containing flameproofing agent are used for the production of industrial moldings, in particular of vehicle parts.

Polymer blends of polyphenylene ethers (PPE) and styrene polymers which contain low molecular weight phosphorus compounds, such as phosphine oxides or phosphates, have the disadvantage that some of the flameproofing agent is exuded during processing of these materials.

In order to avoid this undesirable exudation, higher molecular weight phosphorus compounds are therefore preferably used as flameproofing agents.

DE 30 02 792 claims blends of PPE and high impact polystyrene (HIPS) which contain an aromatic, thermoplastic polyphosphonic ester as the flameproofing agent. However, these molding materials have poor mechanical properties, in particular poor toughness, owing to the incompatibility of the flameproofing agent with the matrix (also see Comparative Example 4).

Molding materials of PPE/HIPS having high fire resistance are also described in DE 28 23 167. The flame retardance is due to the use of block copolymers of polyphenylene ethers and phosphorus-containing compounds. However, the preparation of the block copolymer is very expensive and the resulting fire protection effect is relatively small.

European Patent 147,724 describes flameproofed molding materials of PPE and an alternating copolymer of styrene and a phosphorus compound which are obtained by reacting a styrene dianion, obtained by anionic polymerization, with a halogen-phosphorus compound. The disadvantage of this method is the expensive preparation of the phosphorus-containing styrene polymer.

U.S. Pat. No. 4,371,672 claims molding materials of PPE and a copolymer which is obtained by polymerizing a phosphorylated vinylaromatic compound. However, the preparation of the phosphorylated vinylaromatic monomer is very expensive.

It is an object of the present invention to provide flameproofed, halogen-free molding materials based on PPE and HIPS, having an easily obtainable, nonexuding flameproofing system.

We have found that this object is achieved by the halogen-free, flameproofed thermoplastic molding materials defined at the outset.

Components of the novel molding materials have the following specific meanings:

Component A:

The suitable polyphenylene ethers (PPE) are known. They are preferably prepared by oxidative coupling of phenols which are monosubstituted or disubstituted in the ortho-position (cf. U.S. Pat. Nos. 3 661 848, 3 378 505, 3 306 874, 3 306 875 and 3 639 656) and are used in amounts of from 5 to 92, preferably from 25 to 75, % by weight.

Examples of substituents are halogen, such as chlorine or bromine, or alkyl of 1 to 4 carbon atoms which preferably has no tertiary α-hydrogen atom, for example methyl, ethyl, propyl or butyl. The alkyl radicals may in turn be substituted by halogen, such as chlorine or bromine, or by hydroxyl. Further examples of possible substituents are alkoxy, preferably of not more than four carbon atoms, or phenyl which is unsubstituted or substituted by halogen and/or alkyl. Copolymers of different phenols, for example copolymers of 2,6-dimethylphenol and 2,3,6-trimethylphenol, are also suitable. Mixtures of different polyphenylene ethers can of course also be used.

Preferably used polyphenylene ethers are those which are compatible with vinylaromatic polymers, ie. completely or very substantially soluble in these polymers (cf. A. Noshay, Block Copolymers, Academic Press, 1977, pages 8 to 10, and O. Olabisi, Polymer-Polymer Miscibility, 1979, pages 117 to 189).

Examples of polyphenylene ethers are
poly(2,6-dilauryl-1,4-phenylene) ether,
poly(2,6-diphenyl-1,4-phenylene) ether,
poly(2,6-dimethoxy-1,4-phenylene) ether,
poly(2,6-diethoxy-1,4-phenylene) ether,
poly(2-methoxy-6-ethoxy-1,4-phenylene) ether,
poly(2-ethyl-6-stearyloxy-1,4-phenylene) ether,
poly(2,6-dichloro-1,4-phenylene) ether,
poly(2-methyl-6-phenyl-1,4-phenylene) ether,
poly(2,6-dibenzyl-1,4-phenylene) ether,
poly(2-ethoxy-1,4-phenylene) ether,
poly(2-chloro-1,4-phenylene) ether and
poly(2,5-dibromo-1,4-phenylene) ether.

Preferably used polyphenylene ethers are those in which the substituents are alkyl of 1 to 4 carbon atoms, such as
poly(2,6-dimethyl-1,4-phenylene) ether,
poly(2,6-diethyl-1,4-phenylene) ether,
poly(2-methyl-6-ethyl-1,4-phenylene) ether,
poly(2-methyl-6-propyl-1,4-phenylene) ether,
poly(2,6-dipropyl-1,4-phenylene) ether and
poly(2-ethyl-6-propyl-1,4-phenylene) ether.

Poly(2,6-dimethyl-1,4-phenylene) ether is particularly, preferred.

Graft copolymers of polyphenylene ethers and vinylaromatic polymers, such as styrene, α-methylstyrene, vinyltoluene and chlorostyrene, are also suitable.

Polyphenylene ethers prepared by such a process generally have a limiting viscosity of from 0.2 to 0.7 dl/g, measured in chloroform at 25° C. This corresponds to a weight average molecular weight ($M_w$) of from 10,000 to 60,000.

Component B:

The polyvinylaromatics used are both homo- and copolymers and toughened polymers of vinylaromatic compounds in amounts of from 5 to 92, preferably from 25 to 75, % by weight.

Particularly suitable vinylaromatic compounds are styrene as well as polystyrenes which are alkylated in the nucleus or in the side chain. However, styrene alone is preferably used.

The homopolymers are prepared by the known mass, solution or suspension methods (cf. Ullmanns Encyclopädie der Technischen Chemie, Volume 19, pages 265–272, Verlag Chemie Weinheim 1980). The homopolymers generally have a weight average molecular weight ($M_w$) of from 1,000 to 300,000.

Examples of suitable comonomers for the preparation of copolymers are (meth)acrylic acid, (meth)acrylates where the alkyl radical is of 1 to 4 carbon atoms, acrylonitrile and maleic anhydride and maleimides. Depending on their structure, the comonomers may be present in different amounts in the styrene polymers.

The miscibility of the copolymer with polyphenylene ether is decisive with regard to the content of comonomers in the copolymer. Such miscibility limits are known and are described, for example, in U.S. Pat. Nos. 4,360,618 and 4,405,753 and in the publication by J. R. Fried, G. A. Hann, Polym. Eng. Sci. 22 (1982), 705. The preparation of the comonomers is carried out by known methods which are described in, for example, Ullmanns Encyclopädie der technischen Chemie (see above). The copolymers generally have a weight average molecular weight ($M_w$) of from 10,000 to 300,000.

The preferably used toughened polystyrene is prepared by polymerizing styrene in the presence of a rubber.

The generally used methods for the preparation of toughened styrene polymers are mass polymerization or solution polymerization in the presence of a rubber, as described in, for example, U.S. Pat. No. 2,694,692, and mass/suspension polymerization methods as described in, for example, U.S. Pat. No. 2,862,906. Of course, other methods may also be used.

Natural or synthetic rubber is usually used as the rubber in toughened polystyrene. Suitable rubbers are natural rubber, polybutadiene, polyisoprene, polybutene, polyoctenylene, acrylonitrile/butadiene, ethylene/propylene, polyester and ethylene rubbers. Graft rubbers having a graft core of butadiene, isoprene or alkyl (meth)acrylates and a graft shell of styrene and/or α-methylstyrene and copolymers of butadiene and/or of isoprene with styrene and other comonomers, which have a glass transition temperature of less than −20° C. (K. H. Illers, H. Breuer, Kolloidzeitschrift 190 (1) (1963), 16–34) are also suitable. Butadiene polymers having a 1,4-cis content of from 25 to 99% by weight are particularly suitable. However, acrylate rubbers and EPDM, polybutylene and polyoctenamer rubbers may also be used.

The toughened styrene polymers usually contain from 3 to 30, preferably from 4 to 14, % by weight of a flexible component.

Component C:

A polymeric phosphorus compound C1 and, if desired, a low molecular weight phosphorus compound C2 are used as flameproofing agents. C1 is usually obtained by free radical polymerization of one or more phosphorus-containing monomers of the following structure with itself or with not more than 80, preferably not more than 60, particularly preferably not more than 50, % by weight (based on C) of a vinylaromatic monomer.

The polymeric phosphorus compounds are those which are obtained by polymerizing or copolymerizing one or more compounds of the following structure:

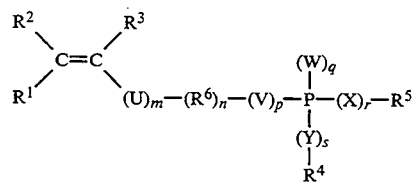

where
$R^6$ is

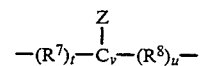

$R^1$, $R^2$, $R^3$, $R^4$, $R^5$ and $R^{10}$ are each hydrogen, alkyl which is preferably of 1 to 8, in particular 1 to 4, carbon atoms, cycloalkyl which is preferably of 4 to 12, in particular 6 to 8, carbon atoms, aralkyl where alkyl is preferably from 1 to 4 carbon atoms, or aryl of 6 to 12 carbon atoms, preferably phenyl or $C_1$-$C_6$-alkyl-substituted phenyl, $R^7$, $R^8$ and $R^9$ are each alkylidene, cycloalkylidene, aralkylidene or arylidene, preferably $C_1$-$C_8$-alkylidene, in particular $C_1$-$C_4$-alkylidene, $C_6$-$C_{12}$-cycloalkylidene, in particular $C_6$-$C_8$-cycloalkylidene, and $C_6$-$C_{12}$-arylidene, preferably phenylidene or $C_1$-$C_6$-alkyl-substituted phenylidene, m, p, q, r, s, t, u and v are each 0 or 1, n is 0, 1 or 2, U is COO, O, S or $NR^9$, preferably COO, V, W, X And Y are each O, S or $NR^9$, preferably O or $NR^9$, and Z is O, S or $NR^{10}$, preferably O or $NR^{10}$.

$R^4$ and $R^5$ are particularly preferably aryl, in particular phenyl, or H, U is COO, n and v are each 0 and Y, V and W are each oxygen. Corresponding compounds have, for example, the following structure:

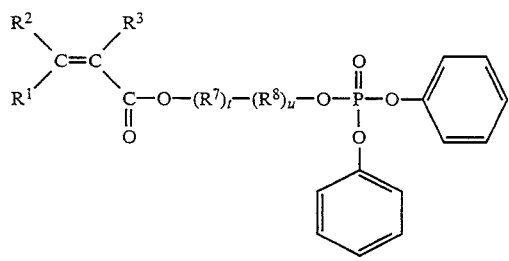

A particularly preferred typical member of this group is diphenyl α-methacryloyloxyethylphosphate.

Particularly suitable vinylaromatic comonomers are styrene and styrenes which are alkylated in the nucleus or in the side chain. However, styrene is preferred.

For the preparation of component C1, all conventional polymerizaion methods, such as emulsion, suspension, mass or solution polymerization, may be used. Emulsion or solution polymerization is preferred.

The method of emulsion polymerization is known per se and is described in, for example, Ullmanns Enzyklopä die der technischen Chemie, 4th Edition (1980), Volume 19, pages 132–145; Encyclopedia of Polymer Science and Engineering, First Edition, Volume 5, pages 801–859; Encyclopedia of Polymer Science and Engineering, Second Edition, Volume 6, pages 1–51.

Solids contents of from 5 to 75, preferably from 10 to 65, % by volume are usually employed. Substances such as potassium persulfate, sodium persulfate, organic peroxides and azo compounds are usually used as polymerization initiators.

Anionic, cationic and amphoteric emulsifiers may be used.

In continuous solution polymerization, the polymer is prepared from the monomeric phosphorus compound and, if desired, the vinylaromatic monomer at from 50° to 150° C. with vigorous stirring. Examples of suitable solvents are benzene, toluene, xylene and ethylbenzene. For this purpose, the monomers can be introduced continuously into the reaction vessel and the polymer likewise removed continuously from the reaction batch.

The polymerization batch may consist of 100% by weight of the phosphorus-containing monomer or of not more than 80% by weight of the vinylaromatic monomer. A copolymer of from 40 to 60% by weight of a phosphorus-containing compound and from 40 to 60% by weight of styrene is preferred.

Suitable phosphorus-containing compounds C2) are phosphine oxides, phosphates, phosphinic acids and salts and esters thereof, phosphonic acids and salts and esters thereof and red phosphorus and mixtures thereof.

Triaryl phosphates and triarylphosphine oxides are preferred. Triphenyl phosphate and triphenyl-phosphine oxide are particularly preferred.

C) contains not more than 80% by weight of component C2), but contents of less than 50% by weight are preferred.

The novel blends of components A, B and C may contain additives such as lubricants, mold release agents, antioxidants, light stabilizers and heat stabilizers, dyes and pigments and mineral reinforcing materials, eg. glass spheres, glass fibers, mineral fibers, whiskers and mica, as are usual for such polymers, in order further to improve their properties.

Not more than 50, preferably not more than 30, % by weight, based on the total weight of the molding material, of such additives may be incorporated.

The novel thermoplastic molding materials are advantageously prepared by mixing the components at from 200° to 350° C. preferably from 250° to 300° C., in a conventional mixing apparatus, such as a kneader, a Banbury mixer or a single-screw or twin-screw extruder. Twin-screw extruders are preferred since thorough mixing is desirable. The mixing times are in general from 0.5 to 30, preferably from 1 to 5, minutes. If required, the molding materials can be processed to give, for example, granules, powders, pellets, sheets or webs. The order in which the individual components are mixed may be varied and selected components may be premixed or all components may be mixed together.

The novel thermoplastic molding materials have good flame resistance in conjunction with good toughness and high heat distortion resistance. The flameproofing agents used are readily obtainable.

Owing to their good processing properties, they are suitable for the production of all types of moldings, for example by injection molding or extrusion. They can also be used for the production of films and semifinished products by the deep drawing or blow molding method.

EXAMPLES

Blends of about 4 kg each were prepared on a Model ZSK 30 twin-screw extruder from Werner & Pfleiderer at a melt temperature of 280° C. The compounded products were converted by injection molding at 280° C. into test specimens, and the following characteristics were measured using these test specimens:

Fire behavior according to UL 94 (Underwriter Laboratories), Classification in UL 94 V-0, UL 94 V-1 or UL 94 V-2

Total penetration energy, penetration test according to DIN 53,443

Softening temperature (Vicar) in °C. under a load of 49.05N and with a temperature gradient of 50 K/hour, according to DIN 53,460.

The formation of a mold coating or exudation of the flameproofing agent was evaluated on the basis of injection molding tests.

Component A (Polyphenylene ether)

Poly-2,6-dimethyl-1,4-phenylene ether having a limiting viscosity of 0.50 dl/g (measured in chloroform at 25° C.);

Component B (Polystyrene)

B1) High impact polystyrene containing 9% by weight of polybutadiene as the rubber component and having capsule particle morphology and a median particle size ($d_{50}$) of about 0.3 μm (Polystyrene 525K from BASF);

B2) High impact polystyrene containing 8% by weight of polybutadiene as the rubber component and having cellular particle morphology and a median particle size ($d_{50}$) of about 2.8 μm (Polystyrene 476L from BASF).

Component C (Flameproofing agent)

C1,1) A mixture of 160 g of styrene and 106 g of diphenyl α-methacryloyloxyethylphosphate was added at 65° C. to 3,350 g of water, 6.7 g of potassium persulfate, 8.4 g of sodium bicarbonate and 55.5 g of sodium alkylsulfonate (K30 from Bayer). The mixture was polymerized for 15 minutes. A mixture of 954 g of styrene and 954 g of diphenyl α-methacryloyloxyethylphosphate was then added dropwise in the course of 3 hours and stirring was continued for 2 hours. A further 1 g of potassium persulfate was added and stirring was carried out for 1 hour at 70° C. The polymer was precipitated after cooling.

Diphenyl α-methacryloyloxyethylphosphate is available as a commercial product from Daihachi. It is prepared by condensing methacrylic acid and diphenyl oxyethylphosphate.

C1,2) As for C1,1, except that styrene was dispensed with as a comonomer and only diphenyl α-methacryloyloxyethylphosphate was polymerized.

C1,3) For Comparative Experiments, poly-(3,3',5,5'-tetramethylbisphenylene A phenyl phosphonate) was used. The phosphonate was prepared by melting a mixture of equimolar amounts of phenylphosphonyl dichloride and tetramethylbisphenol A (2,2-bis-(4-hydroxy-3,5-dimethylphenyl)-propane), according to DE 30 02 792.

C2) Triphenylphosphine oxide

The composition of the novel formulations and that of the Comparative Examples are shown in Table 1. Table 2 shows the properties of the particular molding materials.

TABLE 1

| | Composition of the molding materials | | | |
|---|---|---|---|---|
| | Comp. A (% by wt.) | Comp. B (% by wt.) | Comp. C1 (% by wt.) | Comp. C2 (% by wt.) |
| Example 1 | 55 | B1  36 | C1, 1  4.5 | 4.5 |
| Example 2 | 43 | B2  43 | C1, 2  14.0 | — |
| Example 3 | 65 | B1  28 | C1, 1  3.0 | 4.0 |
| Example 4* | 43 | B2  43 | C1, 3  14.0 | — |
| Example 5* | 65 | B1  28 | — | 7.0 |

TABLE 2

| Example | Vicat temperature (°C.) | Total penetration energy (Nm) | Fire class according to UL 94 | Mold coating/ Exudation |
|---|---|---|---|---|
| 1 | 143 | 50 | V-1 | no |
| 2 | 134 | 54 | V-0 | no |
| 3 | 154 | 49 | V-1 | no |
| 4* | 132 | 27 | V-1 | no |
| 5* | 135 | 46 | V-1 | yes |

4*, 5* are Comparative Examples

We claim:

1. A halogen-free flameproofed thermoplastic molding material based on polyphenylene ethers and polystyrene, containing, as essential components, A) from 5 to 92% by weight (based on the total weight of the material) of one or more polyphenylene ethers, B) from 5 to 92% by weight (based on the total weight of the material) of a vinylaromatic polymer C) from 3 to 25% by weight (based on the total weight of the material) of a flameproofing agent based on C1) from 20 to 100% by weight (based on the total amount of C) of a polymeric phosphorous compound which is obtained by polymerizing or copolymerizing one or more compounds of the following structure:

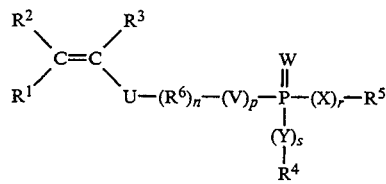

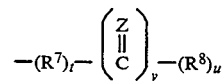

$R^1$, $R^2$, $R^3$, $R^4$, $R^5$, $R^9$ and $R^{10}$ are each hydrogen, alkyl, cycloalkyl, aralkyl or aryl, $R^7$ and $R^8$ are each alkylidene, cycloalkylidene, aralkylidene or arylydene, p, r, s, t, u and v are each 0 or 1, n is 0, 1 or 2, U is

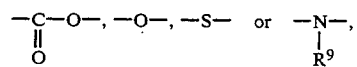

V, X and Y are each

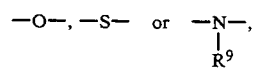

W is =O, =S or =$NR^9$,

Z is =O, =S or =$NR^{10}$, with the proviso that the sum of m+n+p is equal to or greater than 1, and C2) from 0 to 80% by weight (based on the total amount of C) of a low molecular weight phosphorous compound selected from the group consisting of the phosphine oxides, phosphates, phosphonic acids and salts and esters thereof, phosphonic acids and salts and esters thereof and red phosphorous.

2. A thermoplastic molding material as claimed in claim 1, wherein the phosphorus compound C1) is copolymerized with not more than 80% by weight (based on the total amount of C) of a vinylaromatic compound.

3. A film or molding made from a thermoplastic molding material as claimed in claim 1.

4. The molding material of claim 1 wherein C₁ comprises a compound of the following structure:

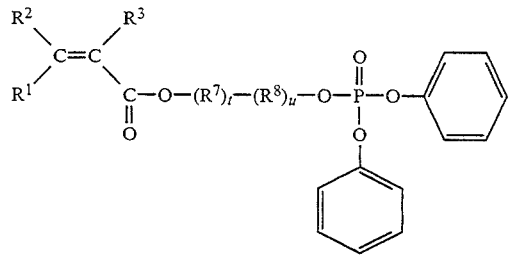

5. The molding material of claim 4 wherein the compound is diphenyl α-methacryloxyethylphosphate.

6. The molding material of claim 5 wherein component A is poly-2,6,-dimethyl-1,4-phenylene ether having a limiting viscosity of 0.50 dl/g (measured in chloroform at 25° C.) and component B is polystyrene.

* * * * *

UNITED STATES PATENT AND TRADEMARK OFFICE
CERTIFICATE OF CORRECTION

PATENT NO.: 5,444,123

DATED: August 22, 1995

INVENTOR(S): ZELTNER et al.

It is certified that error appears in the above-identified patent and that said Letters Patent is hereby corrected as shown below:

Title page,
Item [57], after the first formula, insert --$R^6$ is-- after "where".

Claim 1, column 8, after the first formula (at line 18), insert --where $R^6$ is--.

Claim 5, column 10, line 14, "methacryloxyethylphosphate" should read --methacryloyloxyethylphosphate--.

Signed and Sealed this

Thirty-first Day of October 1995

Attest:

BRUCE LEHMAN

Attesting Officer

Commissioner of Patents and Trademarks